United States Patent
Lee

(10) Patent No.: US 10,955,102 B1
(45) Date of Patent: Mar. 23, 2021

(54) OPTICAL UNIT OF LAMP FOR VEHICLE

(71) Applicant: HYUNDAI MOBIS CO., LTD., Seoul (KR)

(72) Inventor: Jong Cheol Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/795,324

(22) Filed: Feb. 19, 2020

(30) Foreign Application Priority Data

Oct. 17, 2019 (KR) .......................... 10-2019-0129128

(51) Int. Cl.
*F21S 41/25* (2018.01)
*F21S 41/20* (2018.01)

(52) U.S. Cl.
CPC .............. *F21S 41/25* (2018.01); *F21S 41/285* (2018.01)

(58) Field of Classification Search
CPC ........ F21S 41/25; F21S 41/285; F21S 41/147; F21S 41/148; F21S 41/143; F21S 41/255; F21S 48/125; F21S 48/115; F21S 48/1241; F21S 41/265; F21Y 2115/10; B60Q 1/06; B60Q 1/16
USPC ........................................................ 362/538
See application file for complete search history.

(56) References Cited

U.S. PATENT DOCUMENTS

2016/0230948 A1\* 8/2016 Kratochvil ............ F21S 41/321
2019/0234571 A1 8/2019 Gromfeld

FOREIGN PATENT DOCUMENTS

DE 102011085314 B3 \* 4/2013 ............ F21S 41/151
JP 2018-067535 A 4/2018
KR 10-1994611 B1 7/2019

OTHER PUBLICATIONS

Office Action of Korean Patent Application No. 10-2019-0129128—5 pages (Dec. 15, 2020).

\* cited by examiner

*Primary Examiner* — Andrew J Coughlin
*Assistant Examiner* — Jessica M Apenteng
(74) *Attorney, Agent, or Firm* — Knobbe Martens Olson & Bear LLP

(57) ABSTRACT

An optical unit of a lamp for a vehicle may include: a first lens unit which lights emitted from light sources arranged in an x-axis direction penetrate while propagating in a y-axis direction; and a second lens unit disposed in the y-axis direction from the first lens unit, and having an incident refracting surface for adjusting an x-axis directional optical path of light having passed through the first lens unit and an emission refracting surface for adjusting a z-axis directional optical path of the light having passed through the incident refracting surface.

10 Claims, 16 Drawing Sheets

OPTICAL UNIT OF LAMP FOR VEHICLE

CROSS-REFERENCE TO RELATED APPLICATION

The present application claims priority under 35 U.S.C. § 119(a) to Korean Patent Application No. 10-2019-0129128 filed on Oct. 17, 2019 in the Korean Intellectual Property Office, which is incorporated herein by reference in its entirety.

BACKGROUND

1. Technical Field

Embodiments of the present disclosure relate to an optical unit of a lamp for a vehicle, and more particularly, to an optical unit of a lamp for a vehicle, which makes it possible to design a lamp for a vehicle with a slimmer structure.

2. Related Art

In general, a vehicle includes a head lamp for illuminating the area ahead of the vehicle during the night or when it is dark. Such a head lamp may be operated in a high beam mode in which the head lamp illustrates an area at a longer distance and a low beam mode in which the head lamp illustrates an area at a shorter distance in order not to reduce the visibility of another road user.

When the illumination mode of the head lamp is manually changed, there is a limitation in properly operating the head lamp, because the change of the illumination mode relies on a driver's determination. Therefore, a head lamp with an ADB (Adaptive Driving Beam) function has been suggested. Such an ADB function intends the head lamp to automatically detect another road user, and partially turn off light corresponding to the area where the detected user is located.

In the related art, when various head lamps including such an ADB head lamp are designed, a spherical lens with a spherical refracting surface is applied, or a plurality of aspherical lenses are applied. However, such an optical structure increases the thickness of the lens or expands the arrangement space of the lens, thereby increasing the volume of the head lamp. Thus, the optical structure has a limitation in designing a head lamp for a vehicle. Therefore, there is a need for a device capable of solving the problem.

The related art of the present disclosure is disclosure in Korean Patent No. 10-1994611 registered on Jun. 25, 2019 and entitle "Head Lamp for Vehicle".

SUMMARY

Various embodiments are directed to an optical unit of a lamp for a vehicle, which can enhance the degree of freedom in design of the lamp for a vehicle.

In an embodiment, an optical unit of a lamp for a vehicle may include: a first lens unit which lights emitted from light sources arranged in an x-axis direction penetrate while propagating in a y-axis direction; and a second lens unit disposed in the y-axis direction from the first lens unit, and having an incident refracting surface for adjusting an x-axis directional optical path of light having passed through the first lens unit and an emission refracting surface for adjusting a z-axis directional optical path of the light having passed through the incident refracting surface.

The first lens unit may have a plurality of lens modules arranged in the x-axis direction, the incident refracting surface may have a plurality of unit incident surfaces on which the lights having passed through the respective lens modules are incident and which are arranged in the x-axis direction, and the emission refracting surface may form a continuous curved surface across the x-axis width of the incident refracting surface including the plurality of unit incident surfaces.

The unit incident surface may have a shape convex in the negative y-axis direction, and have a y-axis position value that is increased toward an end thereof in the x-axis direction. The emission refracting surface may have a shape convex in the y-axis direction, and have a y-axis position value that is decreased toward an end thereof in the z-axis direction.

The unit incident surfaces may be disposed so as to correspond to propagation paths of the lights having passed through the respective lens modules installed in the first lens unit.

The lens module may include: a plurality of light guides disposed so as to correspond to the plurality of light sources, respectively; and a first lens body connected to the plurality of light guides, and having a plurality of unit emission surfaces through which lights having passed through the respective light guides are emitted in the form of parallel lights.

The unit emission surface may have a shape convex in the y-axis direction, and have a y-axis position value that is decreased toward ends thereof in the x-axis and z-axis directions.

The plurality of unit emission surfaces constituting the one lens module may have the same shape and are arranged in a preset direction.

The first lens unit may include: a first lens module having the unit emission surfaces arranged in a first direction parallel to a first extension line; and a second lens module disposed in the x-axis direction from the first lens module, and having the unit emission surfaces arranged in a second direction parallel to a second extension line.

Based on one reference extension line which connects a first reference position set on the first extension line to a second reference position set on the second extension line so as to correspond to the first reference position, the first lens module may be disposed at a first angle where the first extension line overlaps a first focus serving as the focus of light passing through the first lens module, and the second lens module may be disposed at a second angle where the second extension line overlaps a second focus serving as the focus of light passing through the second lens module.

The first focus serving as the focus of light passing through the first lens module may be disposed at a first distance from the first reference position set on the first extension line, and the second focus serving as the focus of light passing through the second lens module may be disposed at a second distance, obtained by adding a unit distance to the first distance, from the second reference position which is set on the second extension line so as to correspond to the first reference position.

The unit distance may be set to [the pitch between the optical guides]/[the number of the lens modules].

The optical unit may further include a shading unit disposed between the first lens unit and the second lens unit, and extended toward the boundary between the respective unit incident surfaces from between the lens modules.

In accordance with the embodiment of the present disclosure, the optical unit of the lamp for a vehicle has a structure in which the incident refracting surface for adjusting the x-axis directional optical path of light propagating in the y-axis direction and the emission refracting surface for adjusting the z-axis directional optical path of the light are separately formed on different surfaces of the second lens unit.

Thus, the thickness of the second lens unit can be significantly reduced, compared to an embodiment in which the curved surface for adjusting the optical path of light in the side-to-side direction and the curved surface for adjusting the optical path of light in the top-to-bottom direction are simultaneously formed on one surface or an embodiment in which a first lens structure having a curved surface for adjusting the optical path of light in the side-to-side direction and a second lens structure having a curved surface for adjusting the optical path of light in the top-to-bottom direction are separately manufactured and disposed in the y-axis direction. Thus, it is possible to further improve the degree of freedom in design of the lamp for a vehicle.

DETAILED DESCRIPTION

Hereinafter, an optical unit of a vehicle unit will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
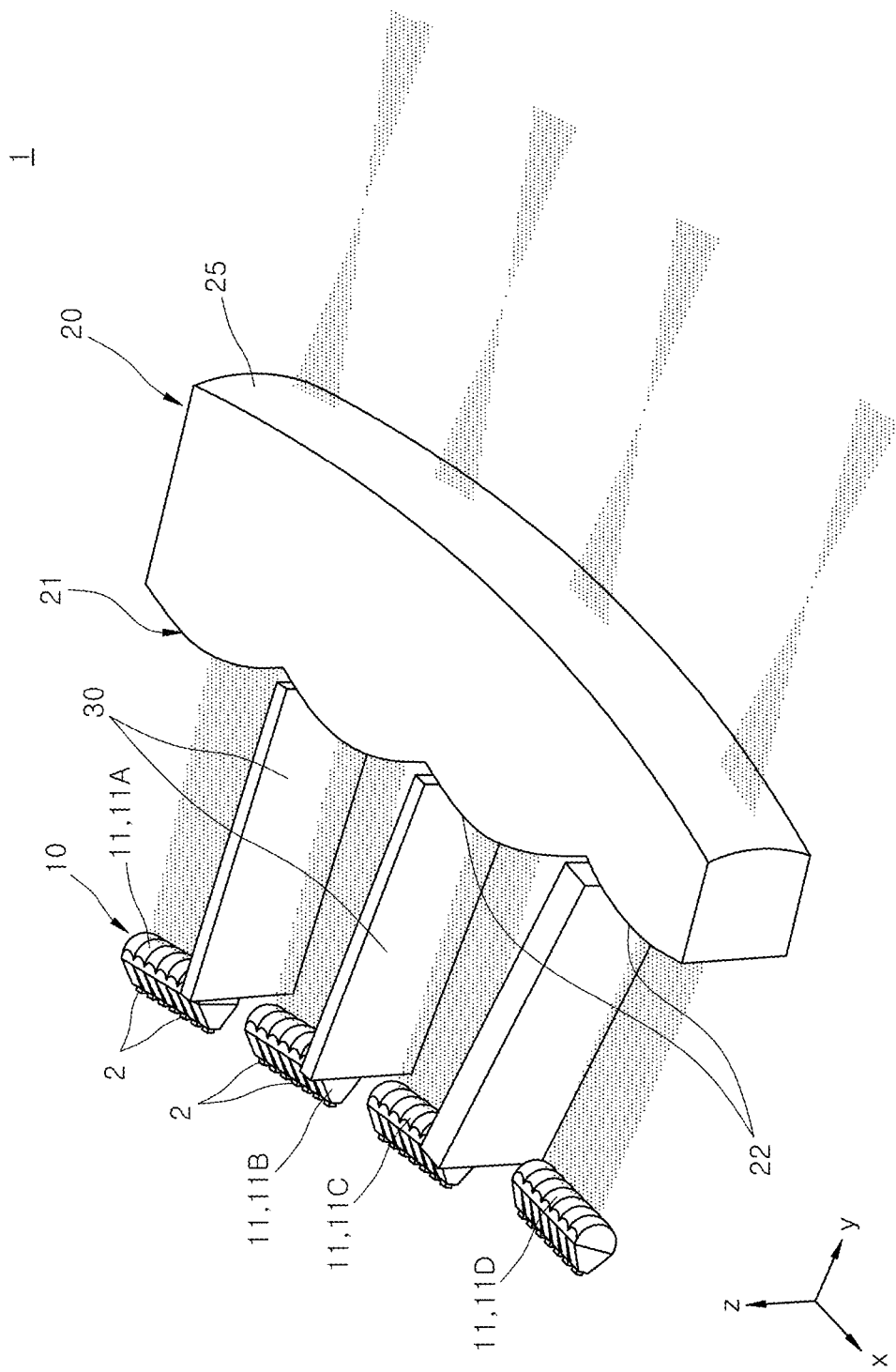
FIG. 1 is a perspective view schematically illustrating an optical unit of a lamp for a vehicle in accordance with an embodiment of the present disclosure.
Figure 2:
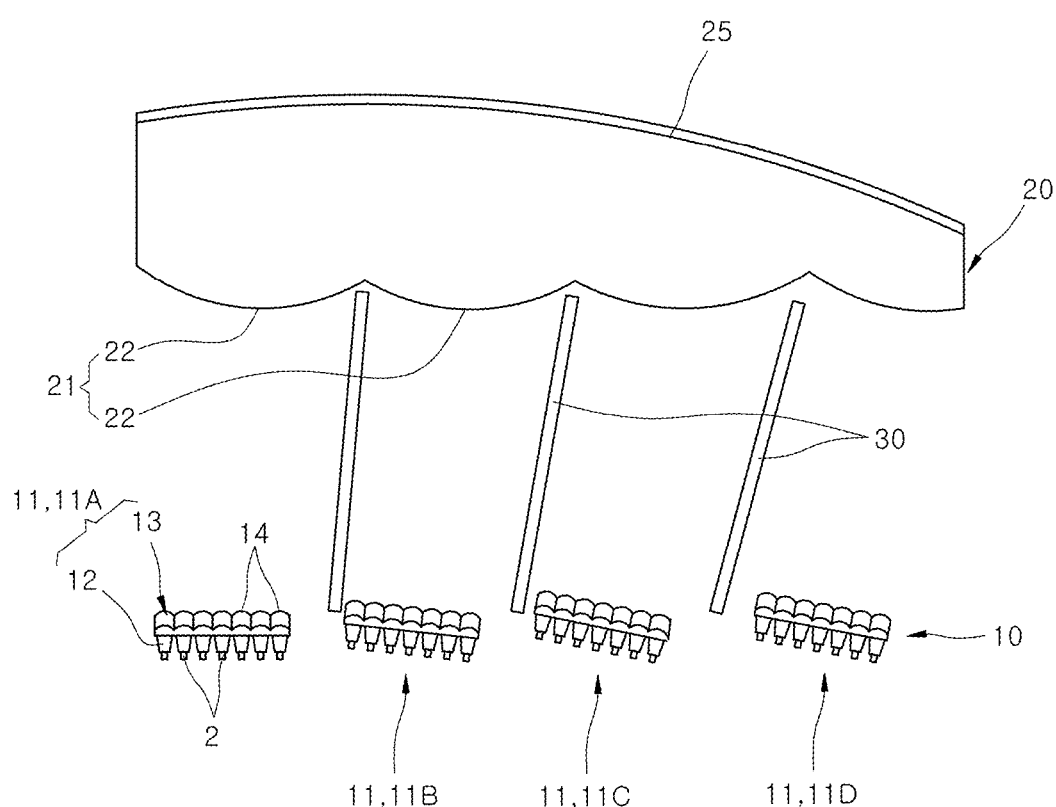
FIG. 2 is a plan view schematically illustrating the optical unit of the lamp for a vehicle in accordance with the embodiment of the present disclosure.
Figure 3:
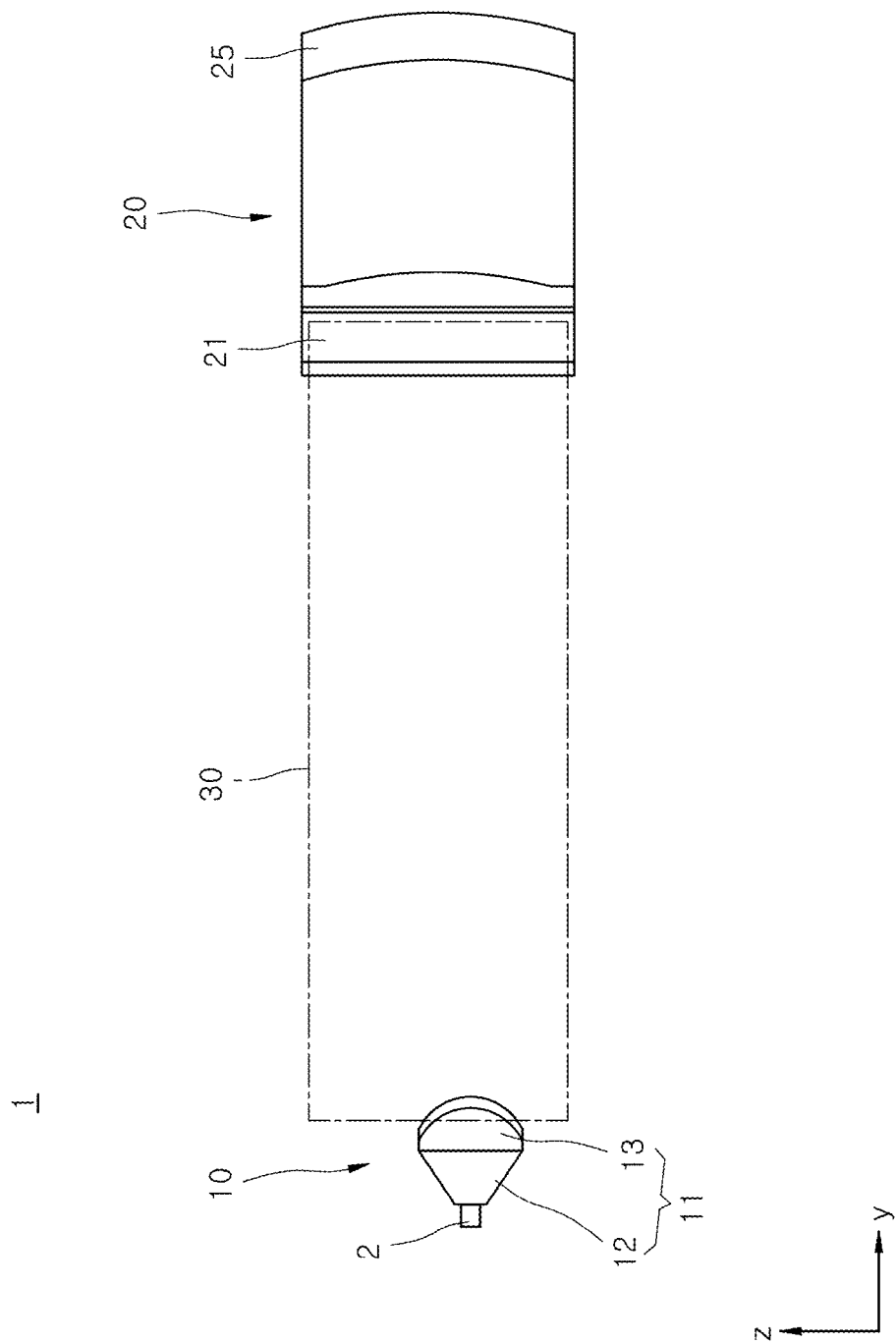
FIG. 3 is a right side view schematically illustrating the optical unit of the lamp for a vehicle in accordance with the embodiment of the present disclosure.

FIG. 1 is a perspective view schematically illustrating an optical unit of a lamp for a vehicle in accordance with an embodiment of the present disclosure, FIG. 2 is a plan view schematically illustrating the optical unit of the lamp for a vehicle in accordance with the embodiment of the present disclosure, and FIG. 3 is a right side view schematically illustrating the optical unit of the lamp for a vehicle in accordance with the embodiment of the present disclosure.

Referring to FIGS. 1 to 3, the optical unit 1 of the lamp for a vehicle in accordance with the embodiment of the present disclosure includes a first lens unit 10, a second lens unit 20 and a shading unit 30.

The first lens unit 10 is disposed in front of a plurality of light sources 2 arranged in an x-axis direction. That is, the first lens unit 10 is disposed in a y-axis direction. Lights emitted from the light sources 2 propagate in the y-axis direction, and penetrate the first lens unit 10. The lights which have been emitted from the plurality of light sources 2 and penetrated the first lens unit 10 propagate in parallel to each other in a preset direction.

The second lens unit 20 is manufactured separately from the first lens unit 10, and disposed so as to be spaced apart from the first lens unit 10 in the y-axis direction. The lights which penetrate the first lens unit 10 and propagate in the y-axis direction successively penetrate the second lens unit 20. At this time, the lights are incident on the second lens unit 20 through an incident refracting surface 21 of the second lens unit 20, and emitted to the outside of the second lens unit 20 through an emission refracting surface 25.

The incident refracting surface 21 has the shape of a refracting surface which can adjust an optical path of light in a side-to-side direction (x-axis direction). The emission refracting surface 25 has the shape of a refracting surface which can adjust an optical path of light, which has penetrated the incident refracting surface 21, in a top-to-bottom direction (z-axis direction). While the light having penetrated the second lens unit 20 sequentially passes through the incident refracting surface 21 and the emission refracting surface 25, the optical path in the side-to-side direction and the optical path in the top-to-bottom direction are respectively adjusted.

The second lens unit 20 has a structure in which a curved surface for adjusting the optical path of light in the side-to-side direction and a curved surface for adjusting the optical path of light in the top-to-bottom direction are not formed on one surface, but separately formed on different surfaces corresponding to the incident refracting surface 21 and the emission refracting surface 25 as described above.

Thus, the thickness of the second lens unit 20 in accordance with the present embodiment may be significantly reduced, compared to an embodiment in which the curved surface for adjusting the optical path of light in the side-to-side direction and the curved surface for adjusting the optical path of light in the top-to-bottom direction are simultaneously formed on one surface or an embodiment in which a first lens structure having a curved surface for adjusting the optical path of light in the side-to-side direction and a second lens structure having a curved surface for adjusting the optical path of light in the top-to-bottom direction are separately manufactured and disposed in the y-axis direction.

The shading unit 30 serves to divide a space formed between the first and second lens units 10 and 20 into a plurality of spaces to block light interference therebetween. The shading unit 30 has a shading panel structure, and is disposed between a plurality of lens modules 11 constituting the first lens unit 10, and extended toward the boundary between a plurality of unit incident surfaces 22 constituting the incident refracting surface 21.

That is, the shading unit 30 is extended in the y-axis direction, formed in a panel shape, and erected in the z-axis direction. One end of the shading unit 30, facing the negative (−) y-axis direction, is disposed between the lens modules 11 adjacent to each other, and the other end of the shading unit 30, facing the positive y-axis direction, is disposed between the unit incident surfaces 22 adjacent to each other. Thus, a plurality of shading units 30 may be installed according to the numbers of the lens modules 11 and the unit incident surfaces 22.

Figure 4:
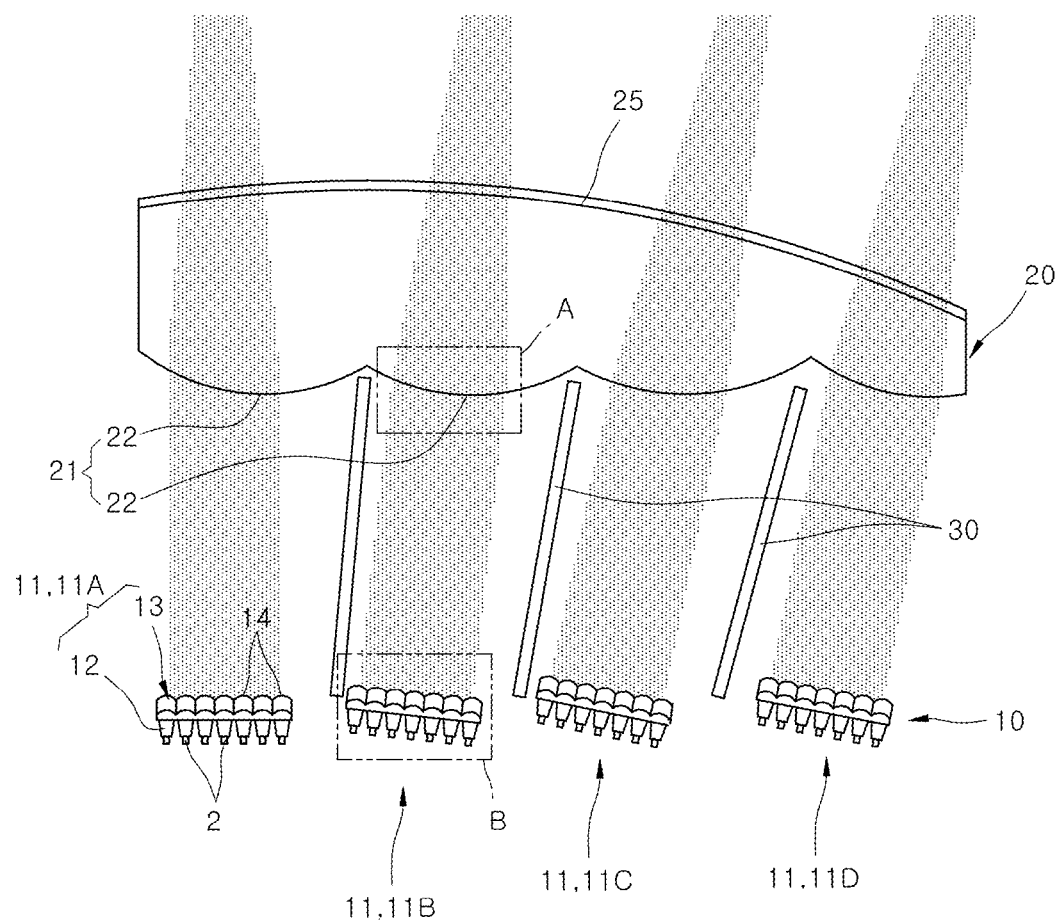
FIG. 4 is a plan view for describing an optical path in FIG. 2.
Figure 5:
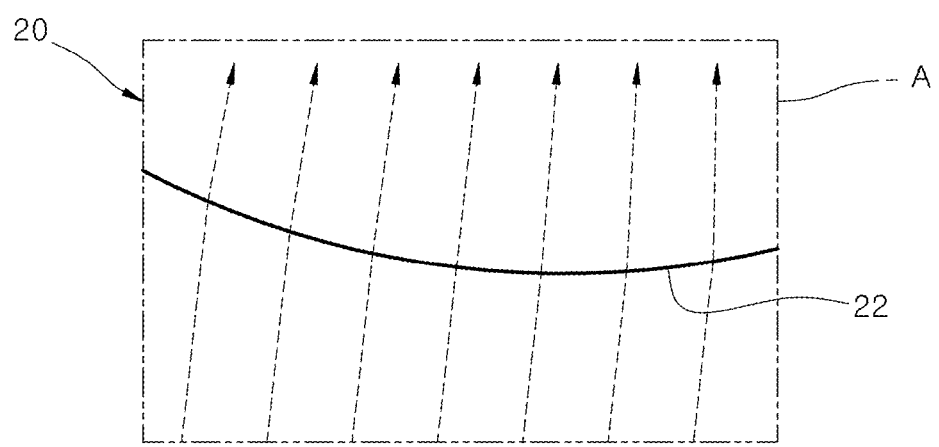
FIG. 5 is an expanded view of a portion A in FIG. 4.
Figure 6:
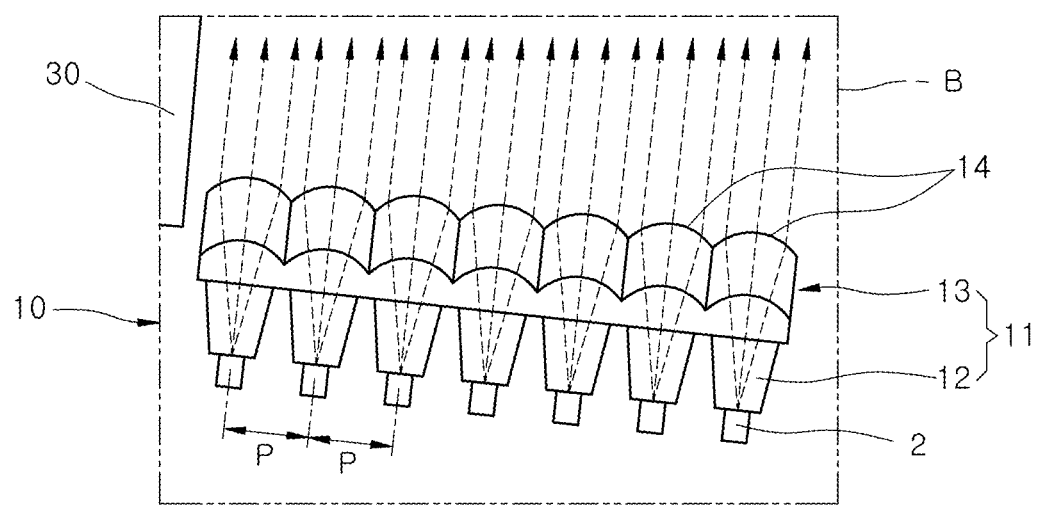
FIG. 6 is an expanded view of a portion B in FIG. 4.
Figure 7:
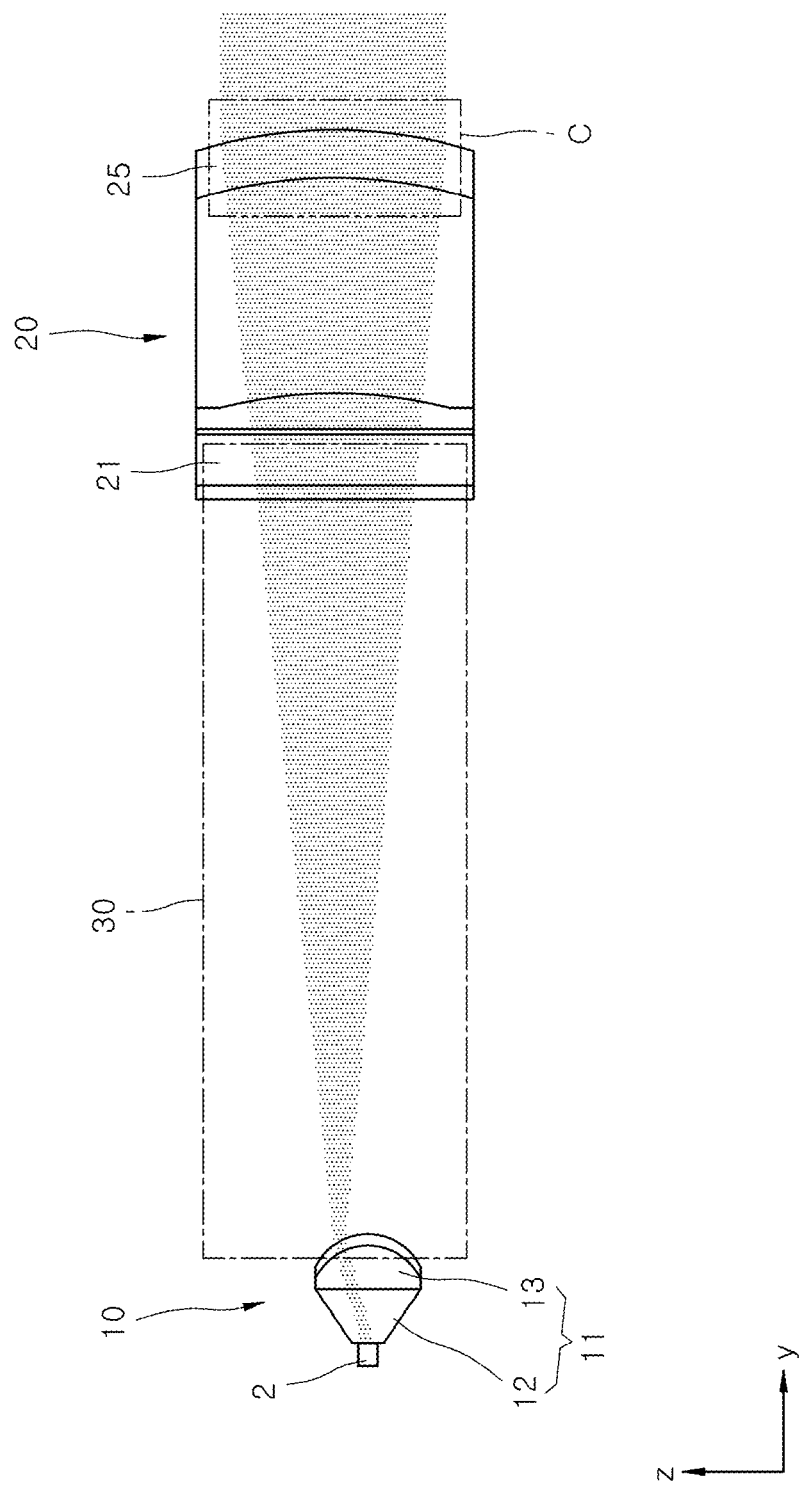
FIG. 7 is a plan view for describing the optical path in FIG. 3.
Figure 8:
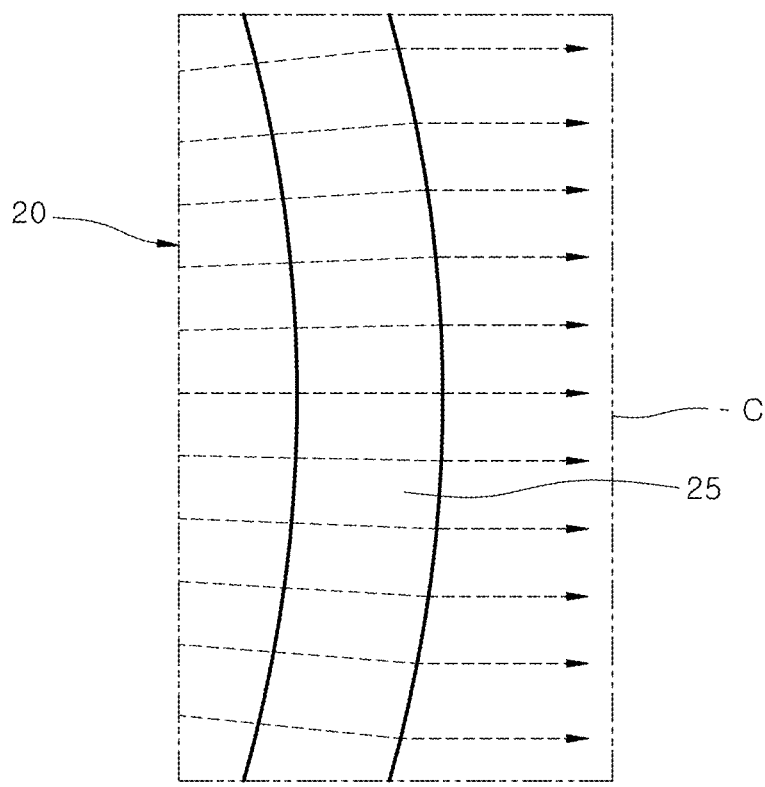
FIG. 8 is an expanded view of a portion C in FIG. 7.

FIG. 4 is a plan view for describing an optical path in FIG. 2, FIG. 5 is an expanded view of a portion A in FIG. 4, FIG. 6 is an expanded view of a portion B in FIG. 4, FIG. 7 is a plan view for describing an optical path in FIG. 3, and FIG. 8 is an expanded view of a portion C in FIG. 7.

Referring to FIGS. 1, 2 and 4, the first lens unit 10 in accordance with the embodiment of the present disclosure has a plurality of lens modules 11 (ex. m lens modules) arranged in the x-axis direction. The first lens unit 10 in accordance with the embodiment of the present disclosure includes four lens modules 11. In the present embodiment, the four lens modules 11 are referred to as a first lens module 11A, a second lens module 11B, a third lens module 11C and a fourth lens module 11D, respectively, for convenience of description.

Each of the lens modules 11 in accordance with the embodiment of the present disclosure, i.e. each of the first to fourth lens modules 11A to 11D, includes light guides 12 and a first lens body 13.

Referring to FIG. 6, the n light guides 12 corresponding to the respective n light sources 2 are disposed at a predetermined pitch P. The lens module 11 in accordance with the embodiment of the present disclosure includes seven light guides 12. The light guides 12 are disposed close to the respective n light sources 2, such that lights emitted from the light sources 2 spaced apart from each other can be incident on the corresponding light guides 12.

The light guide 12 is extended in the y-axis direction, and the light emitted from the light source 2 is mainly directed in the y-axis direction while passing through the light guide 12. Furthermore, when the light guide 12 has a rectangular cross-sectional shape, the light emitted from the light source 2 forms a rectangular emission region (see FIG. 15), while passing through the light guide 12.

The first lens body 13 is connected to ends of the n light guides 12 in the y-axis direction. The n light guides 12 are connected as one body at the predetermined pitch P by the first lens body 13. The first lens body 13 has n unit emission surfaces 14 through which the lights having passed through the respective light guides 12 are emitted in the form of parallel lights.

The unit emission surface 14 has a shape convex in the y-axis direction, and has a y-axis position value which is decreased toward ends thereof in the x-axis and z-axis directions. That is, the unit emission surface 14 has a shape corresponding to a part of a sphere, or specifically a part of the sphere, facing the y-axis direction. The x-axis and z-axis directional optical paths of the light having passed through the light guide 12, i.e. the angle and width of the light, are adjusted by the unit emission surface 14 having the shape of the above-described refracting surface.

Figure 9:
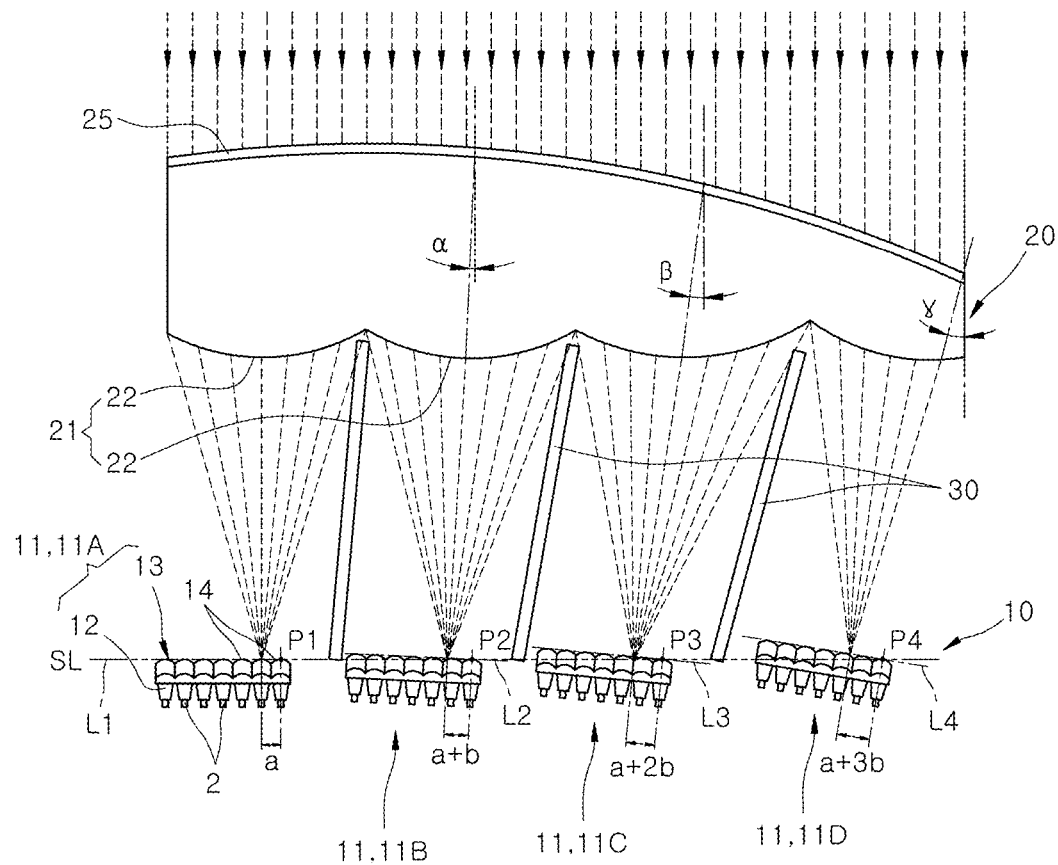
FIG. 9 is a conceptual view for describing focal point distances and the installation direction of lens modules in the optical unit of the lamp for a vehicle in accordance with the embodiment of the present disclosure.

FIG. 9 is a conceptual view for describing the installation direction of the lens modules and focal point distances in the optical unit of the lamp for a vehicle in accordance with the embodiment of the present disclosure.

Referring to FIG. 9, the n unit emission surfaces 14 constituting one lens module 11 have the same shape, and are arranged in a preset direction. More specifically, the first lens module 11A has a structure in which the light guides 12 and the unit emission surfaces 14 are arranged in a first direction (ex. the x-axis direction or the like) parallel to a first extension line L1.

The second lens module 11B is disposed next to the first lens module 11A in the x-axis direction, and has a structure in which the light guides 12 and the unit emission surfaces 14 are arranged in a second direction parallel to a second extension line L2. The third lens module 11C is disposed next to the second lens module 11B in the x-axis direction, and has a structure in which the light guides 12 and the unit emission surfaces 14 are arranged in a third direction parallel to a third extension line L3. The fourth lens module 11D is disposed next to the third lens module 11C in the x-axis direction, and has a structure in which the light guides 12 and the unit emission surfaces 14 are arranged in a fourth direction parallel to a fourth extension line L4.

Figure 10:
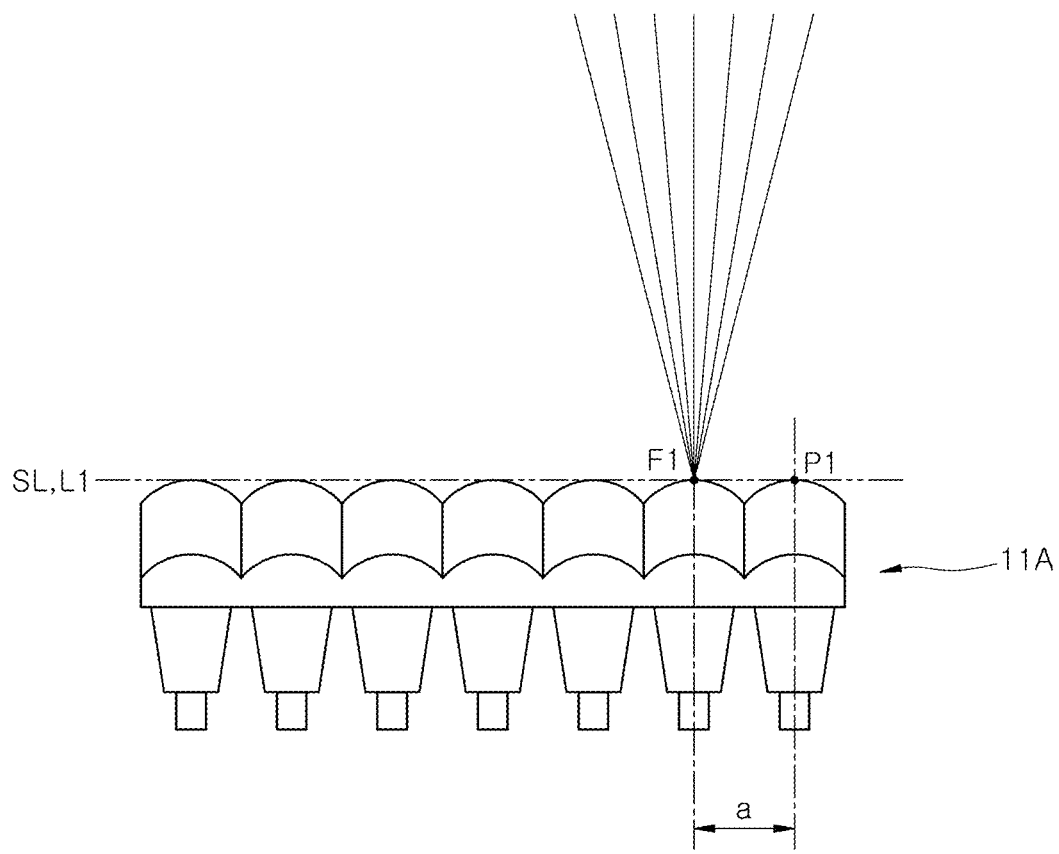
FIG. 10 is a conceptual view illustrating an arrangement of a first lens module in the optical unit of the lamp for a vehicle in accordance with the embodiment of the present disclosure.
Figure 11:
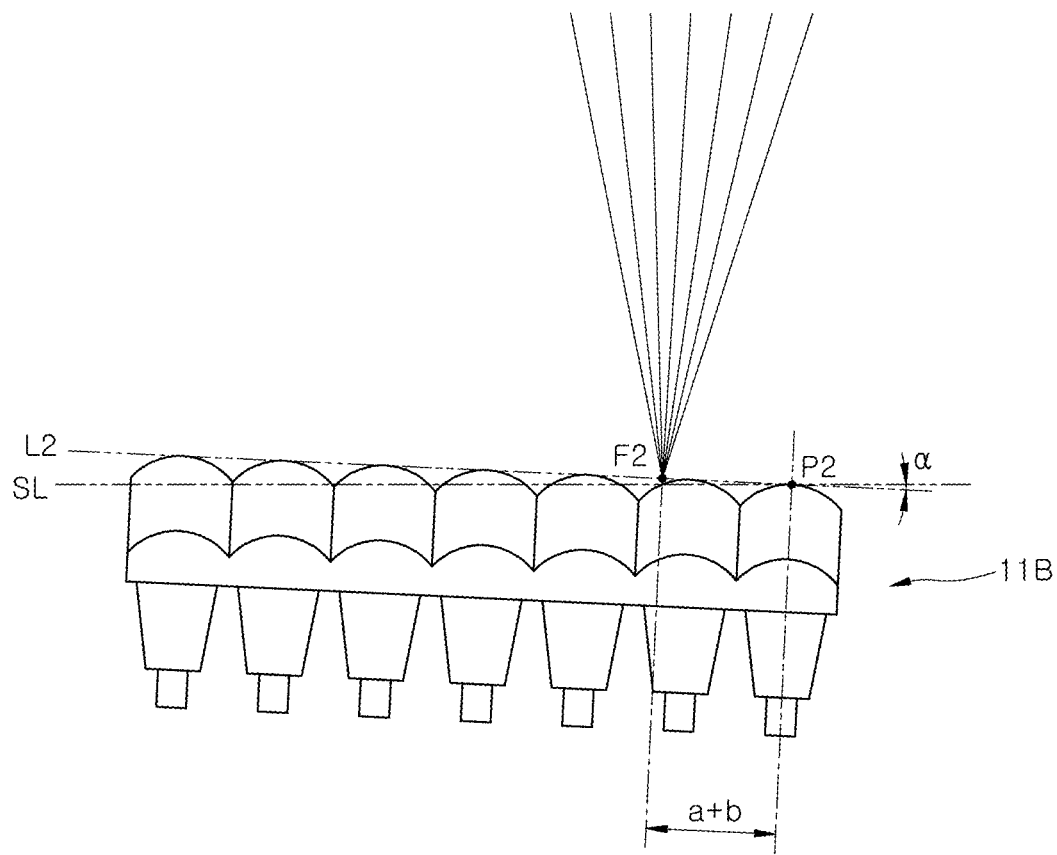
FIG. 11 is a conceptual view illustrating an arrangement of a second lens module in the optical unit of the lamp for a vehicle in accordance with the embodiment of the present disclosure.
Figure 12:
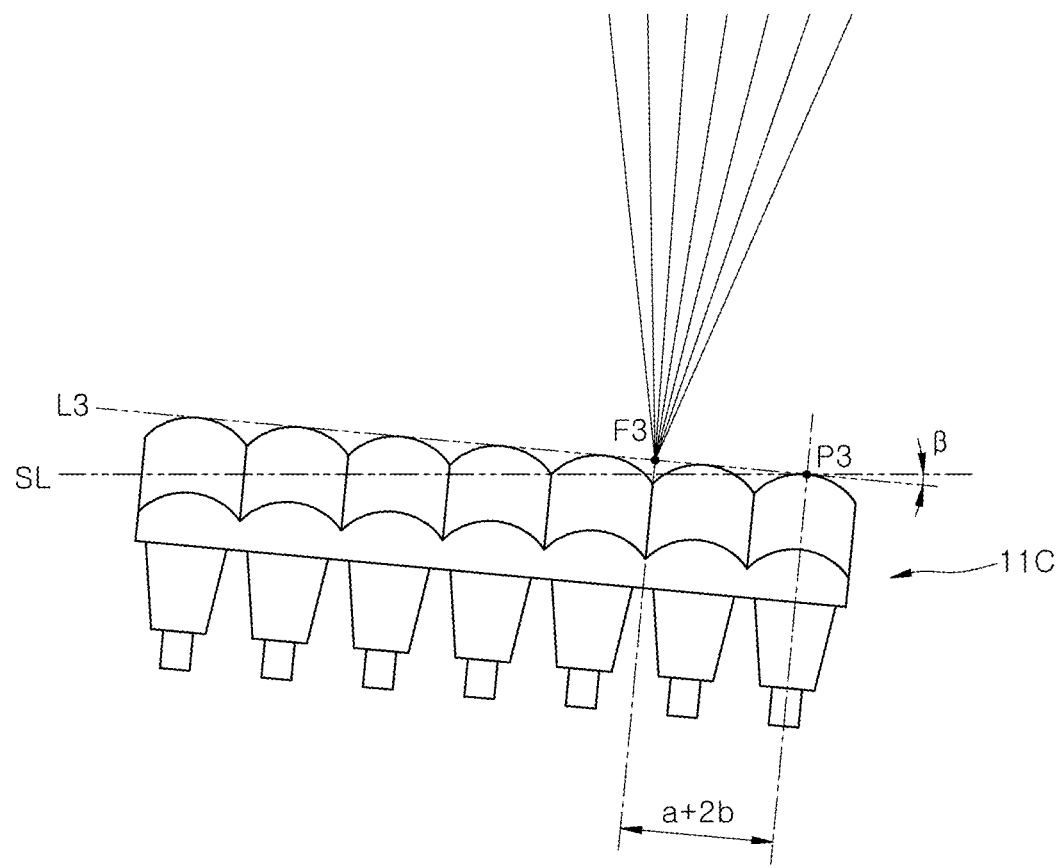
FIG. 12 is a conceptual view illustrating an arrangement of a third lens module in the optical unit of the lamp for a vehicle in accordance with the embodiment of the present disclosure.
Figure 13:
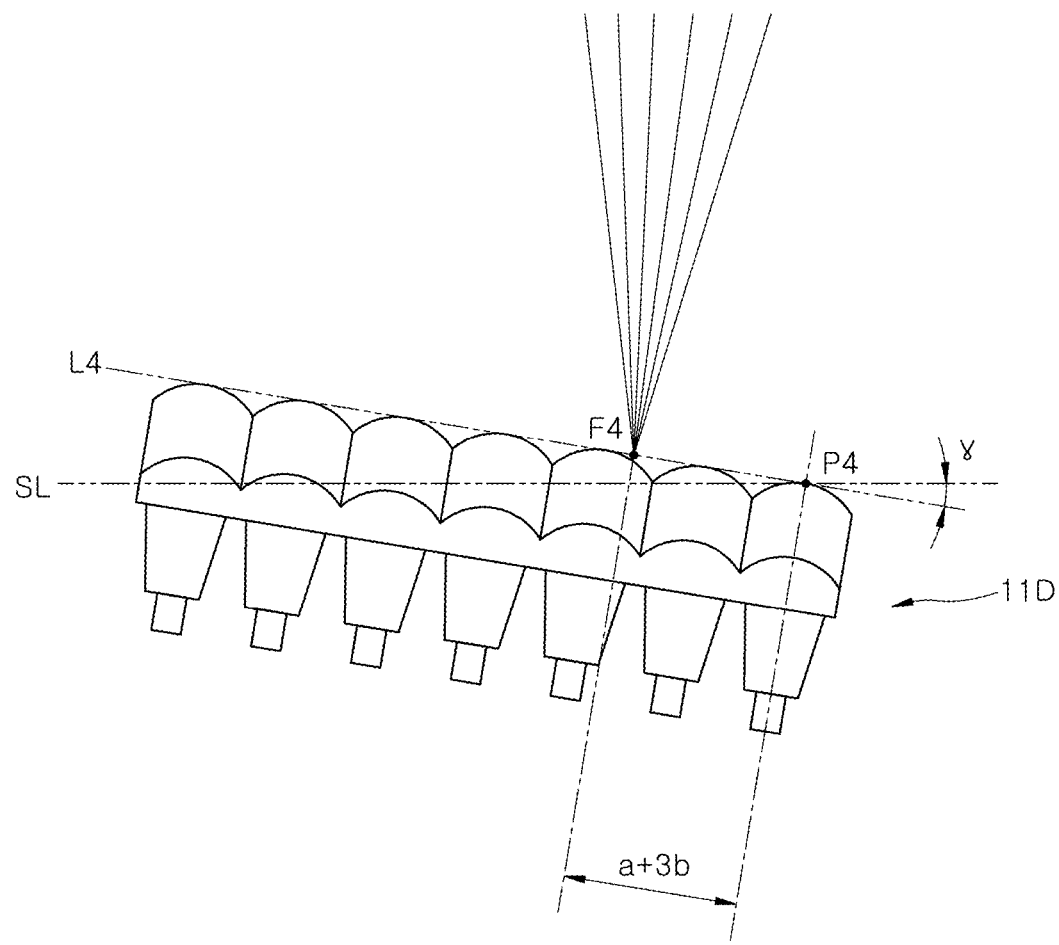
FIG. 13 is a conceptual view illustrating an arrangement of a fourth lens module in the optical unit of the lamp for a vehicle in accordance with the embodiment of the present disclosure.

FIG. 10 is a conceptual view illustrating the arrangement of the first lens module in the optical unit of the lamp for a vehicle in accordance with the embodiment of the present disclosure, FIG. 11 is a conceptual view illustrating the arrangement of the second lens module in the optical unit of the lamp for a vehicle in accordance with the embodiment of the present disclosure, FIG. 12 is a conceptual view illustrating the arrangement of the third lens module in the optical unit of the lamp for a vehicle in accordance with the embodiment of the present disclosure, and FIG. 13 is a conceptual view illustrating the arrangement of the fourth lens module in the optical unit of the lamp for a vehicle in accordance with the embodiment of the present disclosure.

On the first extension line L1, the second extension line L2, the third extension line L3 and the fourth extension line L4, a first reference position P1, a second reference position P2, a third reference position P3 and a fourth reference position P4 may be respectively set. The first to fourth reference positions P1 to P4 are set to points which have the same phase with respect to the first to fourth lens modules 11A to 11D, respectively. In other words, the first to fourth reference positions P1 to P4 are set to points which correspond to the first to fourth lens modules 11A to 11D, respectively.

Referring to FIGS. 10 to 13, each of the first to fourth reference positions P1 to P4 may be commonly set to a point which correspond to the y-axis apex of the unit emission surface 14 located at the x-axis end of the corresponding lens module, among the n unit emission surfaces 14 constituting each of the first to fourth lens modules 11A to 11D.

With the first to fourth reference positions P1 to P4 fixed on one reference extension line SL which is set to connect the first to fourth reference positions P1 to P4, the first to fourth lens modules 11A to 11D may be disposed in difference directions depending on the positions of focuses.

FIG. 9 illustrates optical paths in order to express focuses by the optical unit 1 of the lamp for a vehicle in accordance with the embodiment of the present disclosure. When lights propagate from the positive y-axis direction to the negative y-axis direction of the second lens unit 20, a plurality of focuses corresponding to the number of the n lens modules 11 are formed by the n unit incident surfaces 22.

Lights passing through the four unit incident surfaces 22 propagate to a first focus F1, a second focus F2, a third focus F3 and a fourth focus F4, respectively. With the first to fourth reference positions P1 to P4 set on the reference extension line SL, the angles of the first to fourth extension lines L1 to L4 may be adjusted to make the first to fourth extension lines L1 to L4 overlap the first to fourth focuses F1 to F4, respectively, as illustrated in FIG. 9.

That is, the first extension line L1 is disposed at a first angle to overlap the first focus F1 based on the first reference position P1, and the second extension line L2 is disposed at a second angle to overlap the second focus F2 based on the second reference position P2. The third extension line L3 is disposed at a third angle to overlap the third focus F3 based on the third reference position P3, and the fourth extension line L4 is disposed at a fourth angle to overlap the fourth focus F4 based on the fourth reference position P4.

When the first extension line L1 is made to overlap the reference extension line SL as illustrated in FIG. 10, the second to fourth extension lines L2 to L4 are obliquely extended at relative angles of $\alpha$, $\beta(>\alpha)$ and $\gamma(>\beta)$ with respect to the reference extension line SL as illustrated in FIGS. 11 to 13, respectively.

At this time, the first to fourth extension lines L1 to L4 indicate the installation directions of the first to fourth lens modules 11A to 11D, respectively. As the first to fourth lens modules 11A to 11D are disposed in the above-described manner, the plurality of focuses F1 to F4 are located at the same phase with respect to the respective lens modules 11.

Therefore, the lens modules 11 and the light sources 2 having the same specification may be used to stably implement a uniform light region distribution, and only some of the light sources 2 may be turned on/off to reliably perform a control operation for activating only a light region with a desired shape at a target position or deactivating the light region.

Figure 14:
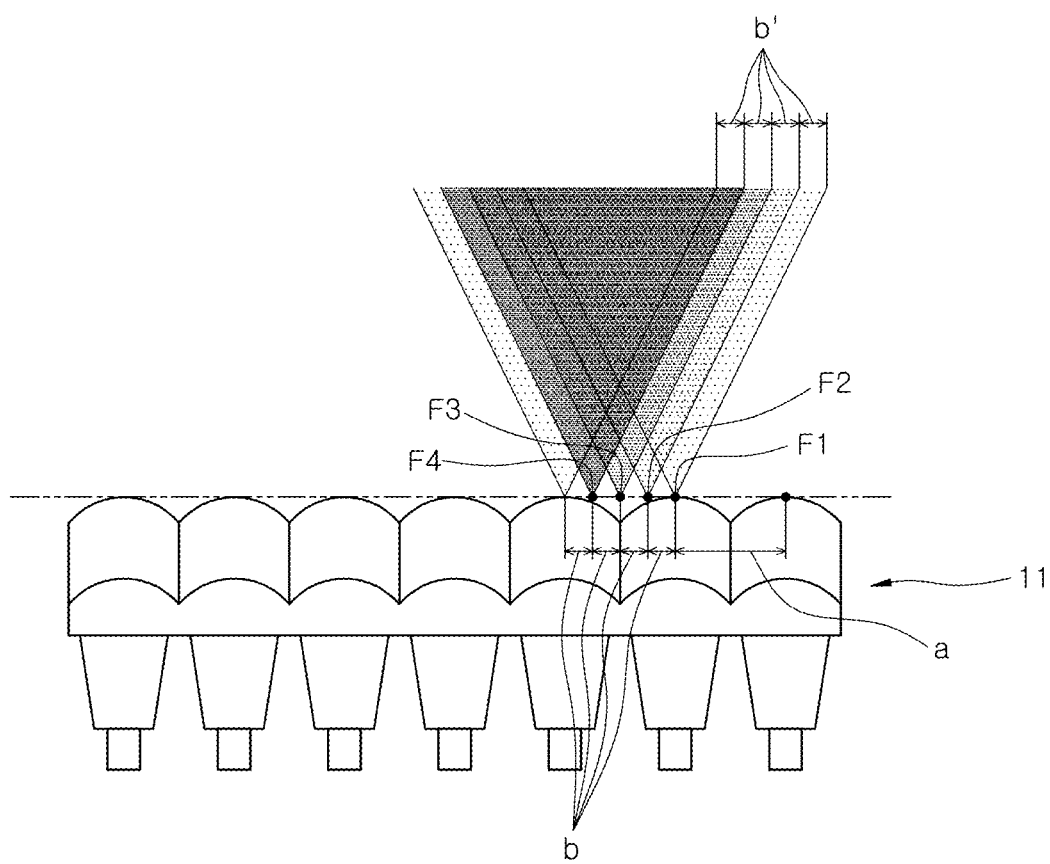
FIG. 14 is a conceptual view illustrating the positional relationships between focuses and the lens modules in the optical unit of the lamp for a vehicle in accordance with the embodiment of the present disclosure.
Figure 15:
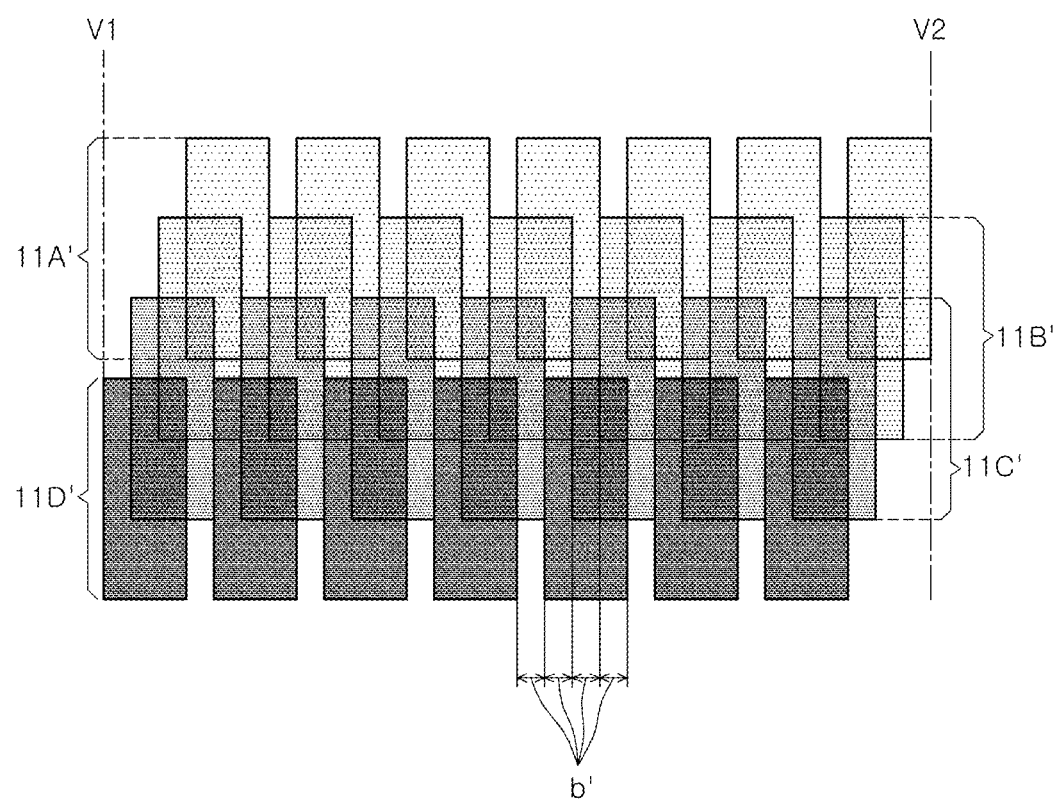
FIG. 15 is a conceptual view illustrating the resolution of a light emission region by the optical unit of a lamp for a vehicle in accordance with the embodiment of the present disclosure.
Figure 16:
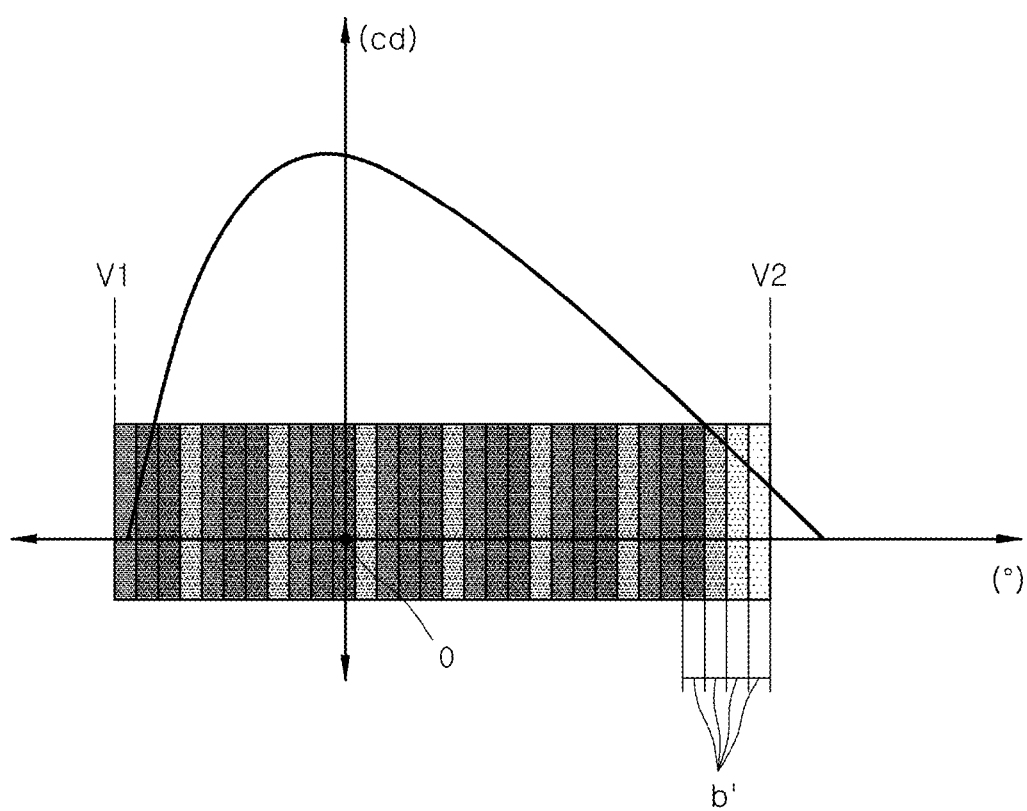
FIG. 16 is a graph illustrating the brightness uniformity of the light emission region by the optical unit of the lamp for a vehicle in accordance with the embodiment of the present disclosure.

FIG. 14 is a conceptual view for describing the positional relationships between the focuses and the lens modules in the optical unit of the lamp for a vehicle in accordance with the embodiment of the present disclosure, FIG. 15 is a conceptual view for describing the resolution of a light emission region by the optical unit of the lamp for a vehicle in accordance with the embodiment of the present disclosure, and FIG. 16 is a graph for describing the brightness uniformity of the light emission region by the optical unit of the lamp for a vehicle in accordance with the embodiment of the present disclosure.

The first focus F1 which is the focus of light penetrating the first lens module 11A is disposed at a first distance (a) from the first reference position P1. The first distance (a) may be set to 0 depending on how to set the first reference position P1. The second focus F2 is disposed at a second distance (a+b), obtained by adding a unit distance (b) to the first distance (a), from the second reference position P2. The unit distance (b) is set to [pitch P between light guides 12]/[number m of lens modules 11].

The third focus F3 is disposed at a third distance (a+2b) from the third reference position P3, and the fourth focus F4 is disposed at a fourth distance (a+3b) from the fourth reference position P4. That is, the first to fourth focuses F1 to F4 are disposed at intervals corresponding to the unit distance (b) as illustrated in FIG. 14.

According to the disposition structures of the first to fourth lens modules 11A to 11D, a light emission region is formed in such a shape that n unit light emission regions constituting each of light emission regions 11A' to 11D' of the first to fourth lens modules 11A to 11D are disposed in the x-axis direction with a pitch (m×b') corresponding to the pitch P between the light guides 12, as illustrated in FIG. 15. Furthermore, the light emission region is formed in such a shape that the light emission regions 11A' to 11D' formed by the first to fourth lens modules 11A to 11D, respectively, are disposed with a unit emission distance (b') corresponding to the unit distance (b) in the x-axis direction.

That is, the disposition structures of the lens modules 11 can implement such high uniformity that m×n unit light emission regions are uniformly disposed across a target light emission region, and implement high resolution corresponding to the unit emission distance (b'), as illustrated in FIG. 16. At this time, the brightness of the light emission region is not irregularly changed a plurality of times, but continuously increased toward the middle portion of the light emission region in the x-axis direction, based on the front O of the lamp for a vehicle, to which the present disclosure is applied.

Referring to FIGS. 1 and 2, the incident refracting surface 21 of the second lens unit 20 in accordance with the embodiment of the present disclosure has a structure in which the m unit incident surfaces 22 on which lights having penetrated the respective lens modules 11 are incident are arranged in the x-axis direction. The unit incident surfaces 22 are disposed so as to correspond to the propagation paths of the lights having passed through the m lens modules 11 included in the first lens unit 10, respectively.

Referring to FIGS. 4 and 5, the unit incident surface 22 has a shape convex in the negative y-axis direction, and has a y-axis position value which is increased toward an end thereof in the x-axis direction. The x-axis angle and width of light propagating in the y-axis direction may be varied and adjusted by the shape of the unit incident surface 22.

Referring to FIGS. 1 and 2, the emission refracting surface 25 of the second lens unit 20 in accordance with the embodiment of the present disclosure forms a continuous curved surface across the x-axis width of the second lens unit 20 including the m unit incident surfaces 22. Referring to FIGS. 7 and 8, the emission refracting surface 25 has a shape convex in the y-axis direction, and has a y-axis position value that is decreased toward an end thereof in the z-axis direction. The z-axis angle and width of light propagating in the y-axis direction may be varied and adjusted by the shape of the emission refracting surface 25.

In accordance with the embodiment of the present disclosure, the optical unit 1 of the lamp for a vehicle, having the above-described configuration, has a structure in which the incident refracting surface 21 for adjusting the x-axis directional optical path of light propagating in the y-axis direction and the emission refracting surface 25 for adjusting the z-axis directional optical path of the light are separately formed on different surfaces of the second lens unit 20.

Thus, the thickness of the second lens unit 20 can be significantly reduced, compared to an embodiment in which the curved surface for adjusting the optical path of light in the side-to-side direction and the curved surface for adjusting the optical path of light in the top-to-bottom direction are simultaneously formed on one surface or an embodiment in which a first lens structure having a curved surface for adjusting the optical path of light in the side-to-side direction and a second lens structure having a curved surface for adjusting the optical path of light in the top-to-bottom direction are separately manufactured and disposed in the y-axis direction. Thus, it is possible to further improve the degree of freedom in design of the lamp for a vehicle.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An optical unit of a lamp for a vehicle comprising:
   a first lens unit which lights emitted from light sources arranged in an x-axis direction penetrate while propagating in a y-axis direction, wherein the first lens unit comprises a plurality of lens modules arranged in the x-axis direction; and
   a second lens unit disposed in the y-axis direction from the first lens unit, and having an incident refracting surface for adjusting an x-axis directional optical path of light having passed through the first lens unit and an emission refracting surface for adjusting a z-axis directional optical path of the light having passed through the incident refracting surface,
   wherein the incident refracting surface has a plurality of unit incident surfaces on which the lights having passed through the respective lens modules are incident and which are arranged in the x-axis direction,
   wherein the emission refracting surface forms a continuous curved surface across an x-axis width of the incident refracting surface including the plurality of unit incident surfaces,
   wherein the unit incident surface has a shape convex in a negative y-axis direction, and has a y-axis position value that is increased toward an end thereof in the x-axis direction,
   wherein the emission refracting surface has a shape convex in the y-axis direction, and has a y-axis position value that is decreased toward an end thereof in the z-axis direction.

2. The optical unit of claim 1, wherein the unit incident surfaces are disposed so as to correspond to propagation paths of the lights having passed through the respective lens modules installed in the first lens unit.

3. An optical unit of a lamp for a vehicle comprising:
   a first lens unit which lights emitted from light sources arranged in an x-axis direction penetrate while propagating in a y-axis direction, wherein the first lens unit comprises a plurality of lens modules arranged in the x-axis direction; and
   a second lens unit disposed in the y-axis direction from the first lens unit, and having an incident refracting surface for adjusting an x-axis directional optical path of light having passed through the first lens unit and an emission refracting surface for adjusting a z-axis directional optical path of the light having passed through the incident refracting surface,
   wherein the incident refracting surface has a plurality of unit incident surfaces on which the lights having passed through the respective lens modules are incident and which are arranged in the x-axis direction,
   wherein the emission refracting surface forms a continuous curved surface across an x-axis width of the incident refracting surface including the plurality of unit incident surfaces,
   wherein the lens module comprises:
      a plurality of light guides disposed so as to correspond to the plurality of light sources, respectively; and
      a first lens body connected to the plurality of light guides, and having a plurality of unit emission surfaces through which lights having passed through the respective light guides are emitted in the form of parallel lights.

4. The optical unit of claim 3, wherein the unit emission surface has a shape convex in the y-axis direction, and has a y-axis position value that is decreased toward ends thereof in the x-axis and z-axis directions.

5. The optical unit of claim 3, wherein the plurality of unit emission surfaces constituting the one lens module have the same shape and are arranged in a preset direction.

6. The optical unit of claim 3, wherein the first lens unit comprises:
   a first lens module having the unit emission surfaces arranged in a first direction parallel to a first extension line; and
   a second lens module disposed in the x-axis direction from the first lens module, and having the unit emission surfaces arranged in a second direction parallel to a second extension line.

7. The optical unit of claim 6, wherein based on one reference extension line which connects a first reference position set on the first extension line to a second reference position set on the second extension line so as to correspond to the first reference position, the first lens module is disposed at a first angle where the first extension line overlaps a first focus serving as the focus of light passing through the first lens module, and the second lens module is disposed at a second angle where the second extension line overlaps a second focus serving as the focus of light passing through the second lens module.

8. The optical unit of claim 7, wherein the first focus serving as the focus of light passing through the first lens module is disposed at a first distance from the first reference position set on the first extension line, and
   the second focus serving as the focus of light passing through the second lens module is disposed at a second distance, obtained by adding a unit distance to the first distance, from the second reference position which is set on the second extension line so as to correspond to the first reference position.

9. The optical unit of claim 8, wherein the unit distance is set to [the pitch between the optical guides]/[the number of the lens modules].

10. An optical unit of a lamp for a vehicle comprising:
   a first lens unit which lights emitted from light sources arranged in an x-axis direction penetrate while propagating in a y-axis direction, wherein the first lens unit comprises a plurality of lens modules arranged in the x-axis direction;
   a second lens unit disposed in the y-axis direction from the first lens unit, and having an incident refracting surface for adjusting an x-axis directional optical path of light having passed through the first lens unit and an emission refracting surface for adjusting a z-axis directional optical path of the light having passed through the incident refracting surface, wherein the incident refracting surface has a plurality of unit incident surfaces on which the lights having passed through the respective lens modules are incident and which are arranged in the x-axis direction, wherein the emission refracting surface forms a continuous curved surface across an x-axis width of the incident refracting surface including the plurality of unit incident surfaces; and a shading unit disposed between the first lens unit and the second lens unit, and extended toward the boundary between the respective unit incident surfaces from between the lens modules.

* * * * *